United States Patent
Fujimoto

(10) Patent No.: US 10,518,976 B2
(45) Date of Patent: Dec. 31, 2019

(54) CHAIN UNIT

(71) Applicant: FANUC CORPORATION, Yamanashi (JP)

(72) Inventor: Takeshi Fujimoto, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/267,781

(22) Filed: Feb. 5, 2019

(65) Prior Publication Data
US 2019/0248588 A1    Aug. 15, 2019

(30) Foreign Application Priority Data
Feb. 9, 2018  (JP) ................................ 2018-022003

(51) Int. Cl.
*B65G 17/38* (2006.01)

(52) U.S. Cl.
CPC ................................... *B65G 17/38* (2013.01)

(58) Field of Classification Search
CPC ................................................... B65G 17/38
USPC ........ 198/834, 850, 851, 852, 853; 474/164, 474/212
See application file for complete search history.

(56) References Cited

U.S. PATENT DOCUMENTS

| | | | |
|---|---|---|---|
| 5,320,582 A * | 6/1994 | Takeda | F16H 7/06 474/140 |
| 5,697,206 A | 12/1997 | Otani et al. | |
| 5,791,455 A * | 8/1998 | Clopton | B65G 17/24 198/779 |
| 6,142,900 A * | 11/2000 | Takamori | B21H 5/02 474/152 |
| 6,402,137 B1 * | 6/2002 | Gunschera | B41F 21/08 198/803.7 |
| 7,568,334 B2 * | 8/2009 | Fujiwara | F16G 13/02 384/283 |
| 7,914,408 B2 * | 3/2011 | Young | F16H 7/06 474/152 |
| 8,202,185 B2 * | 6/2012 | Haesloop | F16H 55/30 474/156 |

(Continued)

FOREIGN PATENT DOCUMENTS

JP    S625115 U    1/1987
JP    S6238206 U    3/1987

(Continued)

OTHER PUBLICATIONS

English translation of Japanese Office Action issued by the Japanese Patent Office in relation to Japanese Application No. 2018-022003 dated Nov. 5, 2019 (4 pages).

*Primary Examiner* — Douglas A Hess
(74) *Attorney, Agent, or Firm* — Robert P. Michal, Esq.; Carter, DeLuca & Farrell LLP

(57) ABSTRACT

A chain unit includes: a chain endlessly extending in a serial direction; a plurality of side rollers arranged on both sides of the chain at intervals along the serial direction of the chain; and a pair of revolving members provided on both sides of the chain and configured to rotate in conjunction with the travel of the chain. Each of the revolving members includes a revolving base and plural projections. The revolving base is located on the interior side of the chain. The projections are arranged in spaces between the neighboring side rollers in the serial direction of the chain so as to protrude from the revolving base.

10 Claims, 6 Drawing Sheets

(56) References Cited

U.S. PATENT DOCUMENTS

| | | | |
|---|---|---|---|
| 8,246,498 B2* | 8/2012 | Sakura | F16H 7/06 |
| | | | 474/212 |
| 8,499,926 B2* | 8/2013 | Steinstrater | B65G 17/002 |
| | | | 198/779 |
| 9,046,151 B2* | 6/2015 | Yokoyama | F16G 13/06 |
| 9,108,799 B2* | 8/2015 | Miyake | B65G 17/44 |
| 9,132,959 B2* | 9/2015 | Blase | F16G 13/16 |
| 9,145,965 B2* | 9/2015 | Kwon | F16H 55/30 |
| 9,482,314 B2* | 11/2016 | Nishizawa | F16G 13/06 |
| 9,939,045 B2* | 4/2018 | Fukumori | F16G 13/06 |
| 10,214,389 B2* | 2/2019 | Turek | B66B 21/02 |
| 2008/0096709 A1 | 4/2008 | Kurohata | |

FOREIGN PATENT DOCUMENTS

| | | |
|---|---|---|
| JP | S638212 U | 1/1988 |
| JP | 08-277886 A | 10/1996 |
| JP | 2006-308106 A | 11/2006 |
| JP | 2008-101683 A | 5/2008 |
| JP | 2015-232352 A | 12/2015 |

* cited by examiner

CHAIN UNIT

CROSS-REFERENCE TO RELATED APPLICATION

This application is based upon and claims the benefit of priority from Japanese Patent Application No. 2018-022003 filed on Feb. 9, 2018, the contents of which are incorporated herein by reference.

BACKGROUND OF THE INVENTION

Field of the Invention

The present invention relates to a chain unit having side rollers arranged on both sides of a chain.

Description of the Related Art

Japanese Laid-Open Patent Publication No. 08-277886 discloses a conveyor chain which is formed of a plurality of pairs of inner plates and a plurality of pairs of outer plates connected to one another in series by coupling pins so as to run continuously around and further includes side rollers arranged in a staggered manner in the serial direction thereof.

SUMMARY OF THE INVENTION

In the conveyor chain of Japanese Laid-Open Patent Publication No. 08-277886, side rollers are arranged in a staggered manner on both sides of the chain along the serial direction of the chain. Therefore, as compared with the configuration in which side rollers are arranged on both sides of the chain so as to oppose each other across the chain, a large gap tends to be formed between the neighboring side rollers in the serial direction. For this reason, foreign material may enter the gap between the neighboring side rollers in the serial direction of the chain, so there is a fear that the traveling of the chain is unintentionally or inadvertently stopped.

It is therefore an object of the present invention to provide a chain unit that can suppress an inadvertent stoppage of the travel of the chain.

According to the aspect of the present invention, a chain unit includes: a chain endlessly extending in a serial direction; a plurality of side rollers arranged on both sides of the chain at intervals along the serial direction of the chain; and a pair of revolving members provided on both sides of the chain and configured to rotate in conjunction with travel of the chain, and is constructed such that each of the revolving members include a revolving base located on an interior side of the chain and a plurality of projections arranged in spaces between the neighboring side rollers in the serial direction of the chain so as to protrude from the revolving base.

In the chain unit of the above aspect, it is possible for the revolving members to prevent foreign material from entering the spaces between side rollers. Therefore, according to the chain unit having the above aspect, it is possible to suppress an inadvertent stoppage of the travel of the chain.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

The conveyor chain unit according to the present invention will be detailed below by describing preferred embodiments with reference to the accompanying drawings.

Embodiment

Figure 1:
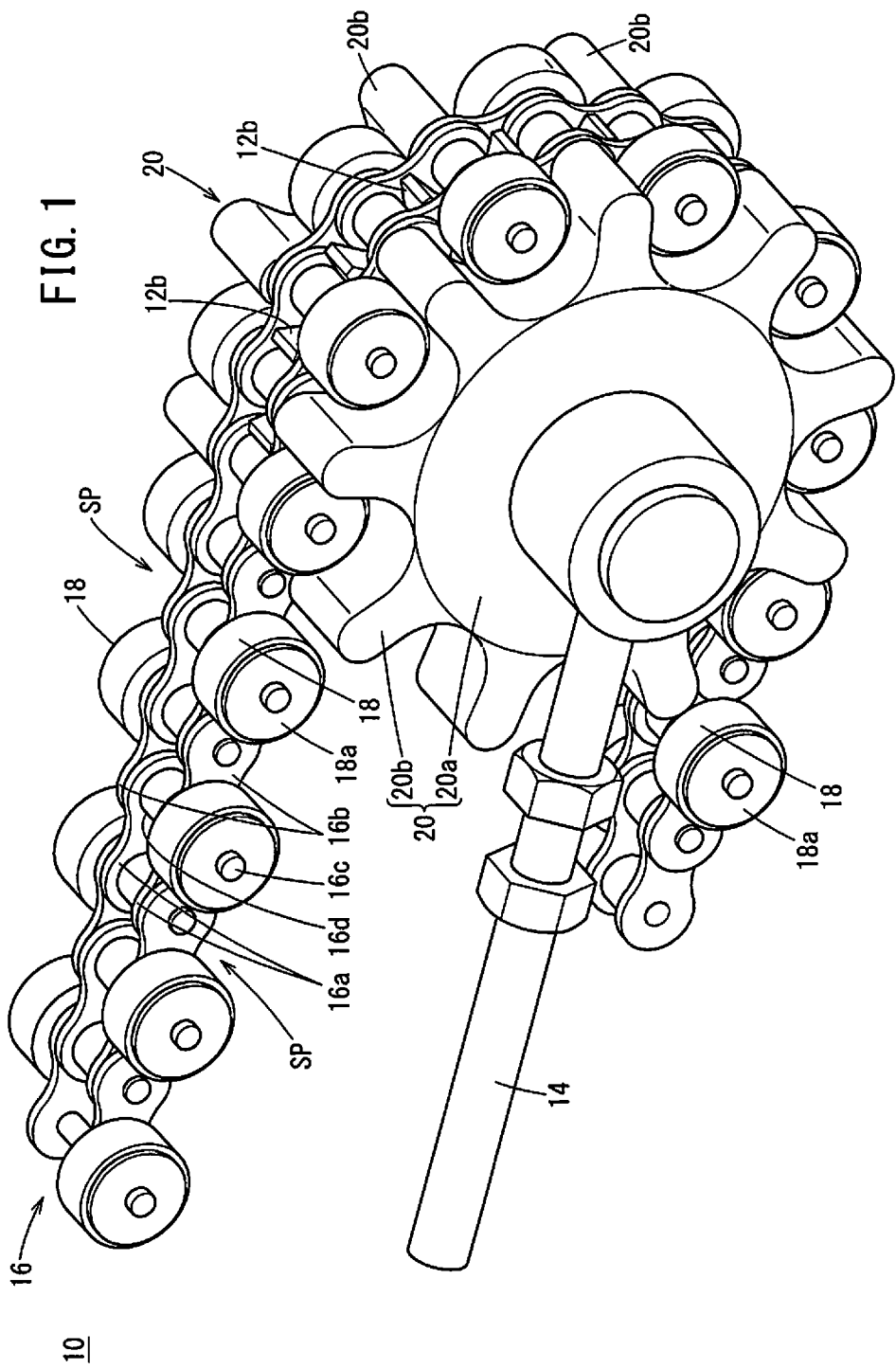
FIG. 1 is a schematic diagram showing a partial configuration of a chain unit in an embodiment.
Figure 2:
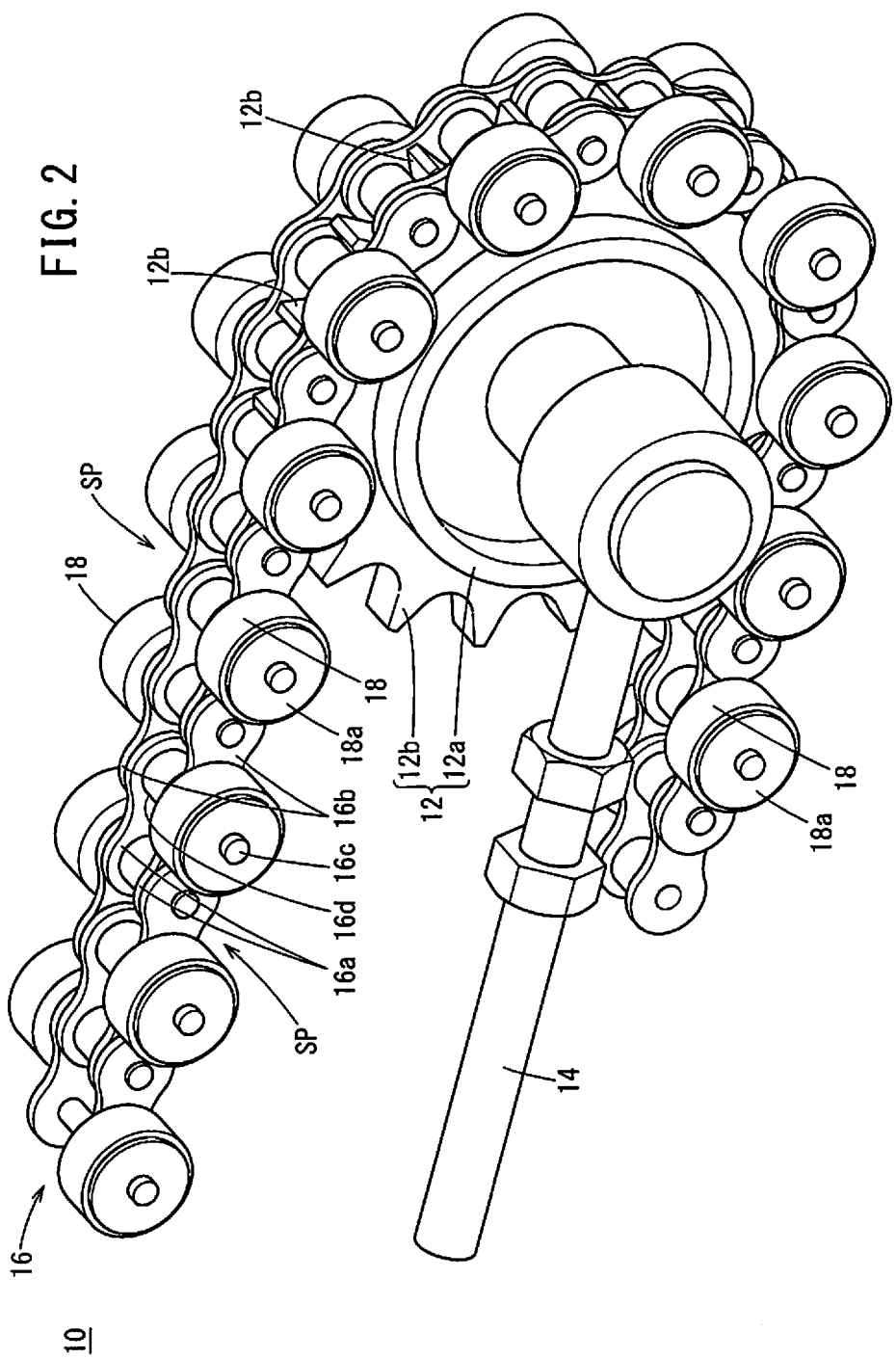
FIG. 2 is a schematic diagram showing the chain unit of FIG. 1 with revolving members omitted.

FIG. 1 is a schematic diagram showing a partial configuration of a chain unit 10 in an embodiment, and FIG. 2 is a schematic diagram showing the chain unit 10 with revolving members 20 omitted. The chain unit 10 according to the present embodiment includes a plurality of sprockets 12, a tensioner 14, a chain 16, a plurality of side rollers 18 and a pair of revolving members 20, as major parts. In FIGS. 1 and 2, for convenience, the tensioner 14 and the chain 16 are partially shown with only one sprocket 12.

The sprocket 12 is a gear that transmits power from a rotary shaft to the chain 16. The sprocket 12 includes a disk-shaped main body 12a and a plurality of teeth 12b projected outward at regular intervals from the circumferential edge of the main body 12a. The tensioner 14 is a member for adjusting the tension of the chain 16. With this tensioner 14, the chain 16 is wound around the plurality of sprockets 12 without any slack.

The chain 16 has a structure in which plural pairs of inner plates 16a and plural pairs of outer plates 16b are rotatably connected in series via plural connecting pins 16c, extending in the serial direction.

Specifically, the inner plate 16a and the outer plate 16b are shifted in the serial direction so that the end portions thereof are overlapped with each other, and the connecting pin 16c is inserted through the overlapping end portions, so that the inner plate 16a and the outer plate 16b are connected in series. The connecting pins 16c are disposed at substantially regular intervals along the serial direction of the chain 16 and directed substantially orthogonal to the serial direction of the chain 16.

A tubular member 16d is provided between each pair of inner plates 16a so as to allow the connecting pin 16c to be inserted therethrough and fix the relative position between the pair of inner plates 16a with respect to the width direction. The tubular members 16d are arranged at substantially regular intervals along the serial direction of the chain 16 so that the teeth 12b of the sprocket 12 mesh with the spaces (or spacing) between the tubular members 16d. Thus, the chain 16 runs in the serial direction in conjunction with the rotation of the sprockets 12.

The plural side rollers 18 are cushioning rollers for alleviating collision and the like between the chain 16 and a conveying body (not shown) placed on the chain 16, and are arranged in the serial direction of the chain 16, on both sides of the chain 16 in a staggered manner.

These side rollers 18 are rotatably provided on the connecting pin 16c that extends outward beyond the outer plate 16b. More specifically, for example, a tubular bush 18a is fixed to the outer surface of the outer plate 16b, and the side roller 18 is attached so as to rotate over the outer circumferential surface of the bush 18a.

The connecting pin 16c that extends outward beyond the outer plate 16b is inserted through the hole of the tubular bush 18a, and the end portion of the penetrated connecting pin 16c is fixed to the bush 18a by a split pin, crimping or the like. The other end of the connecting pin 16c on the opposite side from the end where the side roller 18 is provided is also fixed to the outer plate 16b by a split pin, crimping or the like.

A pair of revolving members 20 are arranged on both sides of the chain 16. Each revolving member 20 has a revolving base 20a formed in a disk shape and a plurality of projections 20b on the revolving base 20a.

The revolving base 20a is located on the interior side of the chain 16. The revolving base 20a is attached to the rotary shaft of the sprocket 12 and rotates together with the sprocket 12 by the power from the rotary shaft. Therefore, the revolving member 20 rotates in conjunction with the traveling of the chain 16. An unillustrated bore is formed in the substantially center of the revolving base 20a, so as to allow for connection between the tensioner 14 and the sprocket 12.

The plural projections 20b are provided at intervals along the circumferential edge of the revolving base 20a so as to protrude outward from the revolving base 20a. The interval between projections 20b is in phase with the interval of spaces (or spacing) SP between the neighboring side rollers 18 in the serial direction (chain direction) of the chain 16.

Figure 3:
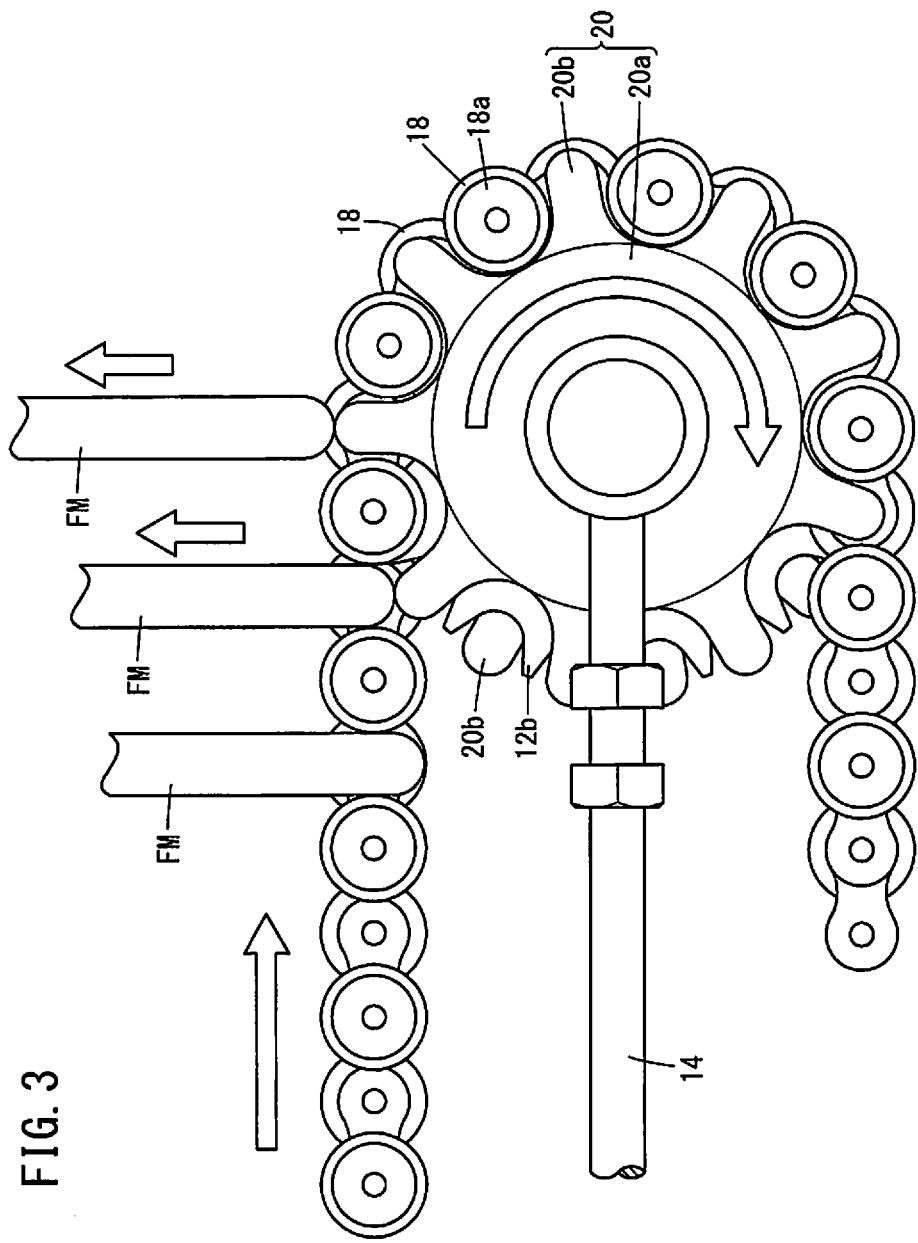
FIG. 3 is a diagram showing how a revolving member turns.

FIG. 3 is a diagram showing how the revolving member 20 turns. In the region where the direction of travel of the chain 16 changes (travel turning region), the chain 16 is wound on the sprocket 12 as the teeth 12b of the sprocket 12 mesh with the chain 16. In this process, the projections 20b of the revolving member 20 rotating together with the sprocket 12 enter the spaces SP between side rollers 18 and move in the same direction as the rotational direction of the sprocket 12 while filling the spaces SP.

Therefore, even if foreign material FM enters spaces SP between the side rollers 18 at a position other than the travel turning region, the foreign material FM is pushed out of the chain 16 as the projection 20b of the revolving member 20 enters the spaces SP between the side rollers 18 in the travel turning region. The foreign material FM enters spaces SP between the side rollers 18 and interferes with the side rollers 18. Examples of the foreign material FM include a finger of the operator or the working clothes and equipment the operator puts on and others.

As described above, in the chain unit 10 of the present embodiment, it is possible for the revolving members 20 to prevent foreign material FM from entering the spaces SP between the side rollers 18. Therefore, according to the chain unit 10 of the present embodiment, it is possible to suppress inadvertent stoppage of the driving of the chain 16.

Here, the projection 20b that enters the space SP between side rollers 18 and the side rollers 18 that put the projection 20b in-between may be either in contact with each other or out of contact. When the projection 20b entering the space SP between side rollers 18 and the side rollers 18 are not in contact with each other, a gap is formed between the projection 20b and the side rollers 18. This gap should be specified such that foreign material FM interfering with the side rollers 18 cannot enter the space SP between the neighboring side rollers 18 in the serial direction of the chain 16.

VARIATIONAL EXAMPLES

Although the above embodiment has been described as an example of the present invention, the technical scope of the present invention should not be limited to the scope described in the above embodiment. It goes without saying that various modifications or improvements can be added to the above embodiment. It is clear from the description of the scope of the claims that modes with such modifications or improvements can be included in the technical scope of the present invention.

Part of the modified or improved forms will be described below as variational examples. Note that the same reference numerals are given to the same components as those described in the above embodiment, and repeated explanation is omitted.

Variational Example 1

In the above-described embodiment, a pair of revolving members 20 are provided in the region where the chain 16 turns back (travel turning region), but may be arranged in a region other than the travel turning region. The direction of travel of the chain 16 is changed by the sprocket 12. In other words, the travel turning region is a portion where the sprocket 12 is disposed, and the region other than the travel turning region is where no sprocket 12 is disposed.

When the chain 16 is an endless one that is wound around, there are plural travel turning regions. The paired revolving members 20 may be arranged in each of the plural travel turning regions or may be provided in part of the plural travel turning regions.

Variational Example 2

Figure 4:
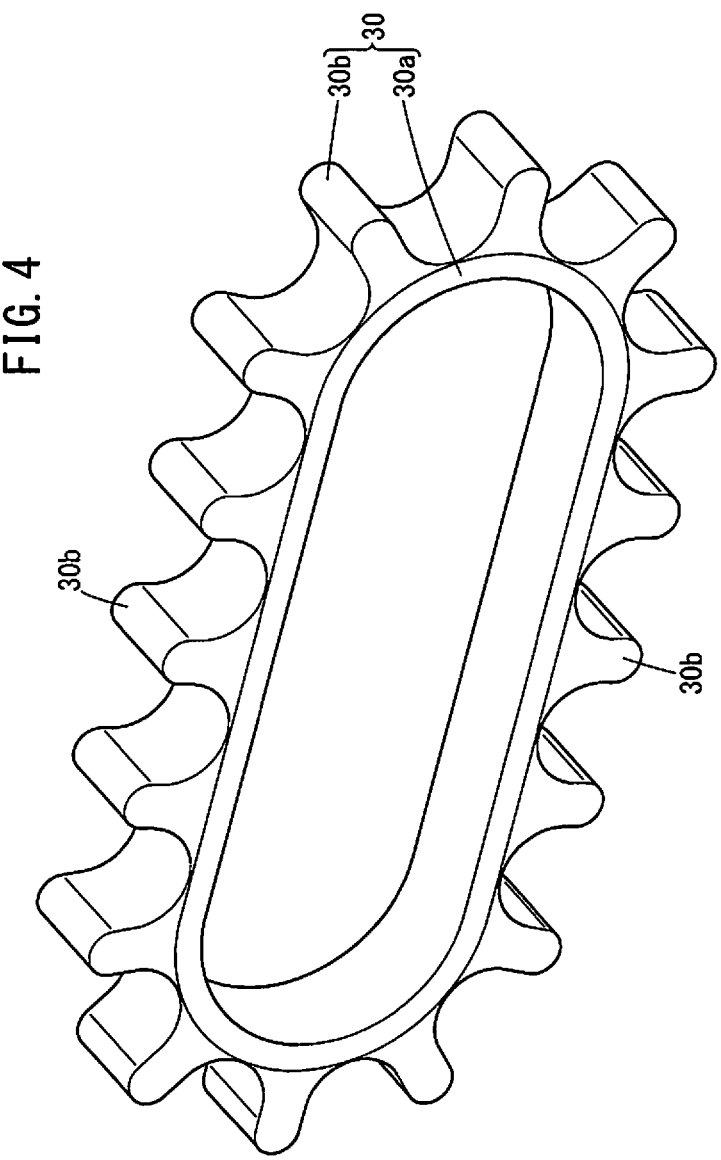
FIG. 4 is a schematic diagram showing a revolving member in a variational example.

In the above embodiment, the disc-shaped revolving members 20 are applied, but as shown in FIG. 4, a belt-shaped revolving member 30 may be used. The revolving member 30 has a revolving base 30a and a plurality of projections 30b formed on the revolving base 30a to fill the spaces SP between side rollers 18.

Similar to the plural projections 20b in the above embodiment, the plural projections 30b are provided so as to protrude outward from the revolving base 30a at intervals along the circumference of the revolving base 30a. The interval between the projections 30b is in phase with the interval of the spaces SP between the neighboring side rollers 18 in the serial direction (chain direction) of the chain 16.

The revolving base 30a has elasticity and is formed in a belt shape. This makes it easy to increase the number of the projections 30b filling the spaces SP between side rollers 18. The plural projections 30b protruding from the revolving base 30a may or may not have elasticity similarly to the revolving base 30a.

Such a revolving member 30 may be arranged in a travel turning region, may be arranged in a region other than the travel turning region, or may be arranged so as to include both a travel turning region and a region other than the travel turning region.

Figure 5:
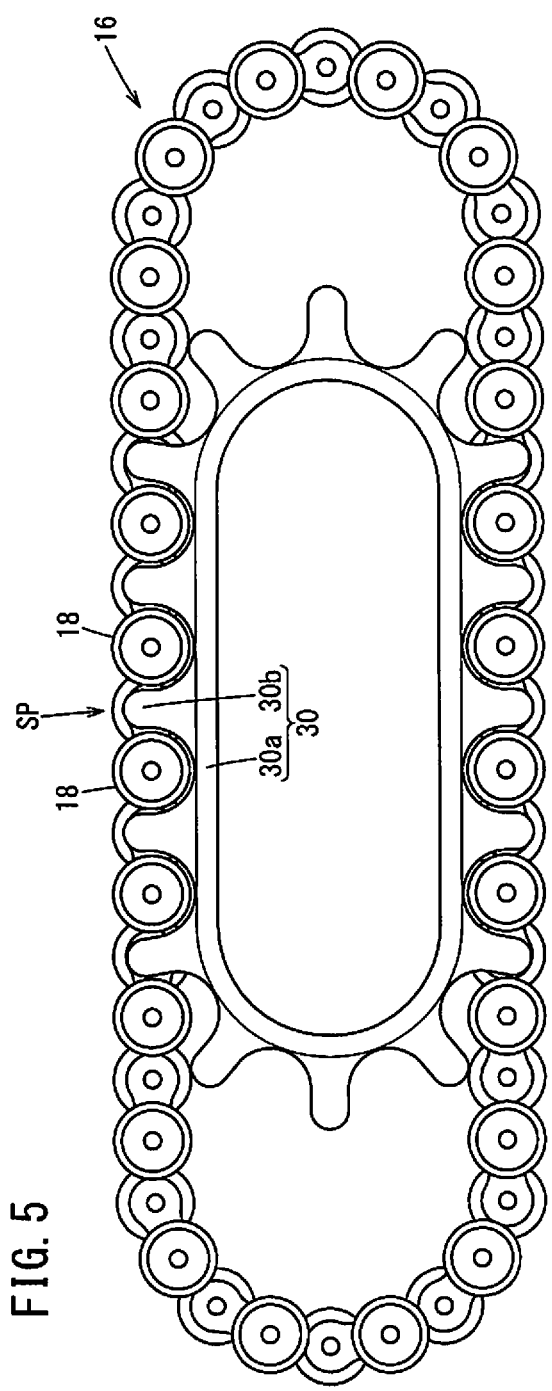
FIG. 5 is a schematic view showing a mounted state (1) of a revolving member according to a variational example.

For example, as shown in FIG. 5, the revolving member 30 can be arranged in a region other than the travel turning region. That is, the revolving base 30a of each revolving member 30 is disposed on the interior side of the chain 16 in a location where the sprocket 12 is not disposed. Further, among the plural projections 30b of each revolving member 30, each of at least two or more projections 30b facing the chain 16 is disposed in such a state as to enter the space SP between the side rollers 18.

Therefore, even if foreign material FM enters spaces SP between the side rollers 18 at a region other than the region where the revolving member 30 is provided, the foreign material FM is pushed out of the chain 16 as the projection 30b enters the spaces SP between the side rollers 18 in the region where the revolving member 30 is provided. Thus, similarly to the above-described embodiment, it is possible to prevent foreign material FM from entering the spaces SP between the side rollers 18.

Figure 6:
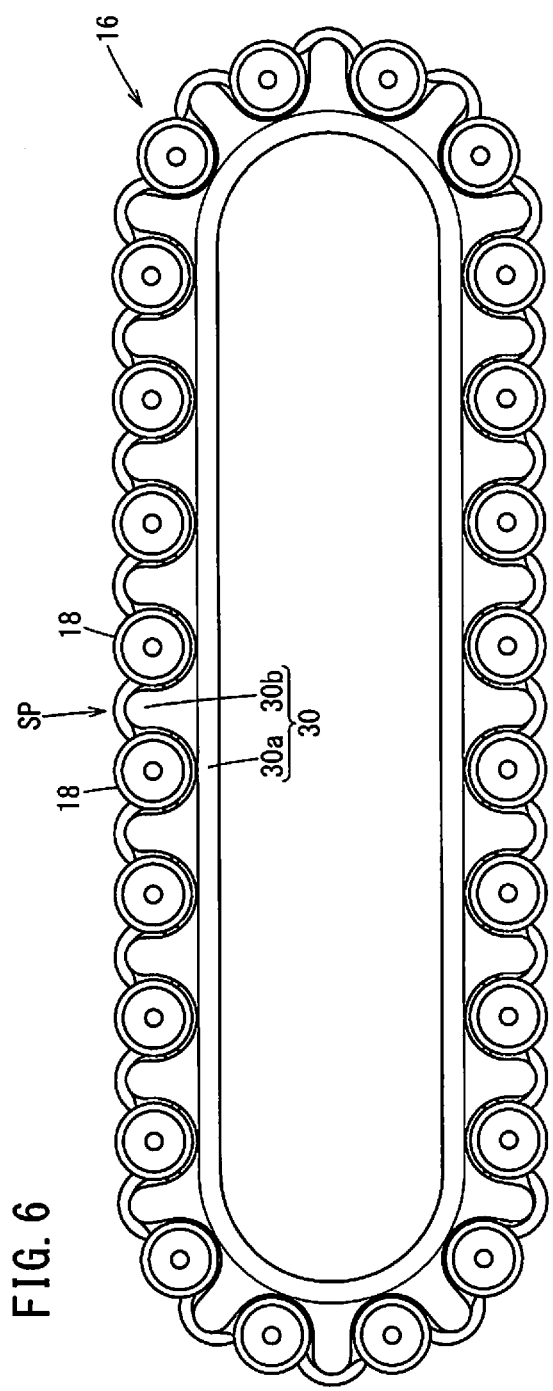
FIG. 6 is a schematic view showing a mounted state (2) of a revolving member of a variational example.

Further, as shown in FIG. 6, it is possible to cover the travel turning regions and other regions than the travel turning regions. That is, the revolving base 30a of each revolving member 30 is disposed on the interior side of the endless chain 16 so as to extend along the entire circumference of the chain 16.

The plural projections 30b on each revolving member 30 is arranged in such a state as to fill all the spaces SP between the neighboring side rollers 18 arranged at intervals on one side of the chain 16. That is, each projection 30b fits on one-to-one correspondence in the space SP between the side rollers 18. In this revolving member 30, all the spaces SP between the side rollers 18 can be prevented from entrance of foreign material FM.

It should be noted that the revolving base 30a with the plurality of projections 30b may be supported by another support member together. Also, among the revolving members 30, the revolving bases 30a disposed on both sides of the chain 16 may be connected by a bridging structure.

Variational Example 3

In the above embodiment, the projection 20b, which enter the space SP between the neighboring side rollers 18 in the serial direction of the chain 16, is accommodated within the space SP, but may be configured to protrude outward beyond the side rollers 18.

Variational Example 4

In the above embodiment, the side rollers 18 on each side of the chain 16 are arranged every other pin, but may be arranged every three or more odd number of pins.

Further, the plural side rollers 18 are arranged in a staggered manner on both sides of the chain 16 along the serial direction of the chain 16. However, the plural side rollers 18 may be provided on both sides of the chain 16 so as to be paired with the chain 16 in-between. In this case, one of the paired side rollers 18 is rotatably provided on one end side of the connecting pin 16c while the other of the paired side rollers 18 is rotatably provided on the other end side of the connecting pin 16c. Here, the one end side of the connecting pin 16c is a portion that extends outward from one of the paired outer plates 16b and the other end side is a portion that extends outward from the other of the paired outer plates 16b.

Variational Example 5

Though in the above embodiment, no roller is provided on the outer circumferential side of the tubular member 16d disposed between the paired inner plates 16a, however, such a roller may be provided.

Variational Example 6

The above embodiment and variational examples 1 to 5 may be arbitrarily combined as long as no inconsistency occurs.

[Technical Ideas]

Technical ideas that can be grasped from the above embodiment and variational examples are described below.

The chain unit (10) includes: the chain (16) endlessly extending in a serial direction; the plurality of side rollers (18) arranged on both sides of the chain (16) at intervals along the serial direction of the chain (16); and the pair of revolving members (20, 30) provided on both sides of the chain (16) and configured to rotate in conjunction with the travel of the chain (16). Each of the revolving members (20, 30) includes the revolving base (20a, 30a) and the plurality of projections (20b, 30b). The revolving base (20a, 30a) is located on the interior side of the chain (16). The projections (20b, 30b) are arranged in spaces (SP) between the neighboring side rollers (18) in the serial direction of the chain (16) so as to protrude from the revolving base (20a, 30a).

In the thus configured chain unit (10), it is possible for the revolving members (20, 30) to suppress entrance of foreign material (FM) into the spaces (SP) between side rollers (18). As a result, it is possible to prevent the chain (16) from being stopped unintentionally or inadvertently.

The revolving members (20, 30) may be provided in a region where the direction of travel of the chain (16) changes. This configuration easily makes the revolving members (20, 30) compact and makes the revolving members (20, 30) unlikely to come off, as compared with the case where the revolving members (20, 30) are provided other than the regions where the direction of travel of the chain (16) changes.

The revolving base (20a, 30a) may be formed in a belt shape having elasticity. This configuration makes it easier to increase the number of projections (30b) filling the spaces (SP) between the side rollers (18).

The revolving base (20a, 30a) may be formed in a belt shape having elasticity, and the plurality of projections (20b, 30b) may be disposed in all the spaces (SP) between the neighboring side rollers (18) in the serial direction of the chain (16). This configuration makes it possible to prevent all the spaces (SP) between the side rollers (18) from entrance of foreign material (FM).

The plurality of side rollers (18) may be arranged in a staggered manner on both sides of the chain (16) along the serial direction of the chain (16), or may be disposed on both sides of the chain (16) so as to be paired while the chain (16) is interposed therebetween.

What is claimed is:

1. A chain unit, comprising:
   a chain endlessly extending in a serial direction;
   a plurality of side rollers arranged outward of and on both sides of the chain at intervals along the serial direction of the chain; and
   a pair of revolving members provided on both sides of a sprocket that transmits power to the chain, the pair of revolving members being configured to rotate in conjunction with travel of the chain, wherein each of the revolving members comprises a revolving base located on an interior side of the chain, and a plurality of projections arranged in spaces between the neighboring side rollers in the serial direction of the chain so as to protrude from the revolving base.

2. The chain unit according to claim 1, wherein the revolving members are provided in a region where a direction of travel of the chain changes.

3. The chain unit according to claim 1, wherein the revolving base is formed in a belt shape having elasticity.

4. The chain unit according to claim 1, wherein:
the revolving base is formed in a belt shape having elasticity; and
the plurality of projections are disposed in all the spaces between the neighboring side rollers in the serial direction of the chain.

5. The chain unit according to claim 1, wherein the plurality of side rollers are arranged in a staggered manner on both sides of the chain along the serial direction of the chain.

6. The chain unit according to claim 1, wherein the plurality of side rollers are disposed on both sides of the chain so as to be paired while the chain is interposed therebetween.

7. The chain unit according to claim 1, wherein the chain includes:
plural pairs of inner plates; and
plural pairs of outer plates rotatably connected in series with the plural pairs of inner plates, the plurality of side rollers being disposed outside of the plural pairs of inner plates and the plural pairs of outer plates.

8. The chain unit according to claim 7, wherein the chain includes a plurality of tubular members disposed between the plural pairs of inner plates.

9. The chain unit according to claim 8, wherein the sprocket has a plurality of teeth received in respective spaces defined between adjacent tubular members of the plurality of tubular members.

10. The chain unit according to claim 1, wherein the sprocket is disposed between the pair of revolving members and has a plurality of teeth received in the chain.

* * * * *